United States Patent

Chimenti et al.

[11] Patent Number: 6,077,552
[45] Date of Patent: Jun. 20, 2000

[54] NON-INVASIVE MONITORING OF THE DONENESS OF A BAKED PRODUCT

[75] Inventors: Dale E. Chimenti; Loren E. Faeth, both of Ames, Iowa

[73] Assignee: Iowa State University Research Foundation, Inc., Ames, Iowa

[21] Appl. No.: 09/375,411

[22] Filed: Aug. 17, 1999

Related U.S. Application Data

[60] Provisional application No. 60/112,004, Aug. 17, 1998.

[51] Int. Cl.$^7$ .................................. A23L 1/00; G05B 1/00
[52] U.S. Cl. .............................. 426/231; 99/327; 99/332; 99/335; 99/342; 426/233; 426/523
[58] Field of Search ..................................... 426/231, 233, 426/238, 523; 99/327, 332, 335, 342, 451, 486

[56] References Cited

U.S. PATENT DOCUMENTS

| | | | |
|---|---|---|---|
| 5,019,972 | 5/1991 | Rim | 364/400 |
| 5,319,266 | 6/1994 | Chu et al. | 307/494 |
| 5,426,580 | 6/1995 | Yoshida et al. | 99/332 |

OTHER PUBLICATIONS

"Air Transducers with High Acoustic Impedance"; Lynnworth, Panametrics, Inc., Waltham, MA 02154.

"On Line, Noncontact Baking Monitor for Bread"; CFW Research, 1999, pp. 1–5.

"Acoustically Isolated Paired Air Transducers for 50–, 100–, 200–, or 500–kHz Applications"; Lynnworth et al., Transactions on Ultrasonics, Ferroelectrics and Frequency Control, vol. 44, No. 5, Sep. 1997.

*Primary Examiner*—George C. Yeung
*Attorney, Agent, or Firm*—Rothwell, Figg, Ernst & Kurz

[57] ABSTRACT

A method and apparatus is provided for the monitoring of the doneness of a baked product without invasively contacting the baked product. An impact is directed against a side of the baked product, and the resulting flex distance due to the propagation of the impact through the baked product is measured. Both the impact and the resulting flex are preferably performed without direct physical contact with the baked product. The flex response time from the impact is compared to a pre-stored threshold, and if the flex response time is less than the threshold, a doneness signal is generated. The doneness signal may be used, for example, to control the baking process, and can be used for the automated monitoring of baked products in a commercial baking environment. The doneness signal can further be used, for example, to control either the baking dwell time, the oven temperature, or both, or to control other baking variables.

37 Claims, 8 Drawing Sheets

NON-INVASIVE MONITORING OF THE DONENESS OF A BAKED PRODUCT

This application is related to provisional application Serial No. 06/112,004, entitled NON-INVASIVE MONITORING OF THE DONENESS OF A BAKED PRODUCT, filed Aug. 17, 1998, to which priority is claimed under 35 U.S.C. 119.

BACKGROUND OF THE INVENTION

1. Field of the Invention

The present invention is related generally to baking, and more particularly to a method and apparatus for monitoring the doneness of a baked product.

2. Description of the Background Art

A baked product is typically a food product that has been exposed to heat (e.g., a dry heat) in order to cook the product from the outside. The baked product is not considered to be finished baking (i.e., done) until its interior is baked. The ability to detect when an item is completely and optimally baked is of great importance in the baking industry. When a bread product for example is completely baked, the gluten in the flour is transformed and the starches contained in the product are gelatinized. The exterior of such a baked product may acquire a shell, while the interior may take on a generally firm consistency. The presence of flour in an item enables it to be baked—e.g., the baking process can serve to polymerize the gluten in wheat and transform it into a firm, spongy structure. The polymerization of gluten is a physical change that can occur when baking bread products (polymerization is a chemical reaction in which small molecules are combined to form large molecules).

Several monitoring approaches for determining the optimal baking time have historically been employed by those in the art. The most popular and age-old method has been simply to bake an item for a fixed time and at a fixed temperature, based on an average time required to bake an item. Another method has been to insert temperature probes into the interior of the item, with baking being halted when the interior of the item reaches a predetermined temperature. A less preferred method has involved cutting or breaking open the item to visually inspect the doneness of the center of the product. Yet another visual monitoring method has been to observe the product exterior for a sufficient change in color. However, each of these prior approaches has significant drawbacks.

First, timed baking has significant drawbacks because it does not account for variations in the baking process. These variations may include, for example, variations in temperature between baking ovens, variations in temperature at different areas inside an oven, variations in ambient humidity and air pressure, and variations in the amounts and qualities of the ingredients.

Second, temperature probes have been used to accurately monitor the internal temperature of a baked product, but they have drawbacks because they invade the product and require additional equipment that must be inserted into the product, removed therefrom, and cleaned.

Third, monitoring the outside color of the product has drawbacks because it attempts to determine the optimal baking time by observing changes in the color of the product. It is well known in the art, however, that the exterior of the product can potentially change color without the interior being done.

Fourth, destructive testing by cutting or breaking open the product in order to visually inspect the interior has drawbacks due to its invasiveness. It is impractical for commercial baking enterprises to intentionally destroy quantities of product in this manner. Destructive testing also requires additional work because the destroyed product must be visually inspected in order to judge its level of doneness.

Some experienced bakers can also judge the doneness of bread by manually tapping it on one side and obtaining a feel of the loaf (i.e., the movement thereof) and observing the sound created. This method, however, has obvious limitations, drawbacks and deficiencies due to human error and the like.

The inability of those in the art to automatically monitor the doneness of a baked product without contacting the product has often resulted in overbaking of the product in an effort to avoid underbaking. This is commonly done to avoid any health risks or consumer dissatisfaction associated with incomplete baking, but the color, texture, flavor, and potentially the nutritional value of the baked product may suffer. Because commercial bakers have been unable to automatically monitor a baked product during the baking process, they have traditionally had to overbake products in order to compensate for the above-described variables.

What is needed, therefore, is an improved method and apparatus for the automatic, non-invasive monitoring of the doneness of a baked product.

SUMMARY OF THE INVENTION

It is therefore an object of this invention to provide an improved automatic, non-invasive monitoring of the doneness of a baked product.

It is another object of the invention to provide a method and apparatus which measures the propagation of a shock wave through the baked product in order to determine doneness.

It is yet another object of this invention to provide a method and apparatus whereby the doneness monitoring is achieved without direct physical contact with the baked product.

It is yet another object of the invention to provide an impact source that does not mechanically contact the baked product.

It is yet another object of the invention to provide a flex measurement that does not mechanically contact the baked product.

The preferred embodiments of the present invention can achieve one or more of the above objects, and the most preferred embodiments can achieve all of these objects.

According to a first aspect of the invention, a method is provided for monitoring doneness of a baked product including the steps of directing an impact against a first side of the baked product, measuring a flex response time of a second side of the baked product as a result of the impact, comparing the flex response time to a predetermined threshold, and generating a doneness signal if the flex response time is less than the predetermined threshold.

According to another aspect of the invention, a method is provided for monitoring doneness of a baked product including the steps of directing an impact against a first side of the baked product by directing an air jet against the first side, directing ultrasonic waves against a second side of the baked product, receiving the ultrasonic waves reflected from the second side of the baked product, measuring a flex response time of the second side of the baked product as a result of the impact by measuring from the time of impact to the time of displacement in the second side of the baked product, comparing the flex response time to a predetermined threshold, and generating a doneness signal if the flex response time is within the predetermined threshold.

According to another aspect of the invention, an apparatus is provided for monitoring doneness of a baked product including an impact device for generating an impact on an exterior surface of the baked product, a distance measuring device for measuring a flex distance of the exterior surface of the baked product as a result of the impact with the distance measuring means outputting an energy signal representative of the flex distance, an integrator device for integrating the energy signal to create an integrated energy signal with the integrated energy signal being representative of the flex response time, a storage device for storing a flex response time threshold corresponding to doneness in the baked product, and a processor device for receiving and comparing the integrated energy signal to the flex response time threshold, and outputting a doneness signal when the integrated energy signal is less than the flex response time threshold.

The above and other objects, features and advantages of the present invention will become clear from the following description of the preferred embodiments thereof, taken in conjunction with the accompanying drawings.

DETAILED DESCRIPTION OF THE PREFERRED EMBODIMENTS

A highly useful variable in the assessment of bread doneness is the elastic behavior of the loaf itself. The preferred embodiments of the present invention monitor this elastic behavior in order to determine doneness. This determination of doneness can be used to provide helpful feedback to the baking process. One significant advantage of the present invention is that monitoring can be performed in real time while the baked product is in motion (e.g., on conveyors or the like). Another notable advantage of the present invention is that the monitoring can be performed without physically contacting the baked product, thereby minimizing the possibility of damage during the baking process. This is ideal, for example, in commercial bakeries using large ovens where baked products pass through an oven on a moving conveyor.

In particular, the preferred embodiments of the present invention determine doneness by impacting a product during baking and automatically detecting the effect of such impact on the product. The most preferred embodiments of this invention pertain to baking of flour based products, and most preferably wheat based flour products, but the present invention can be applied to a variety of baked food products, and even to certain heated non-food products.

Figure 1:
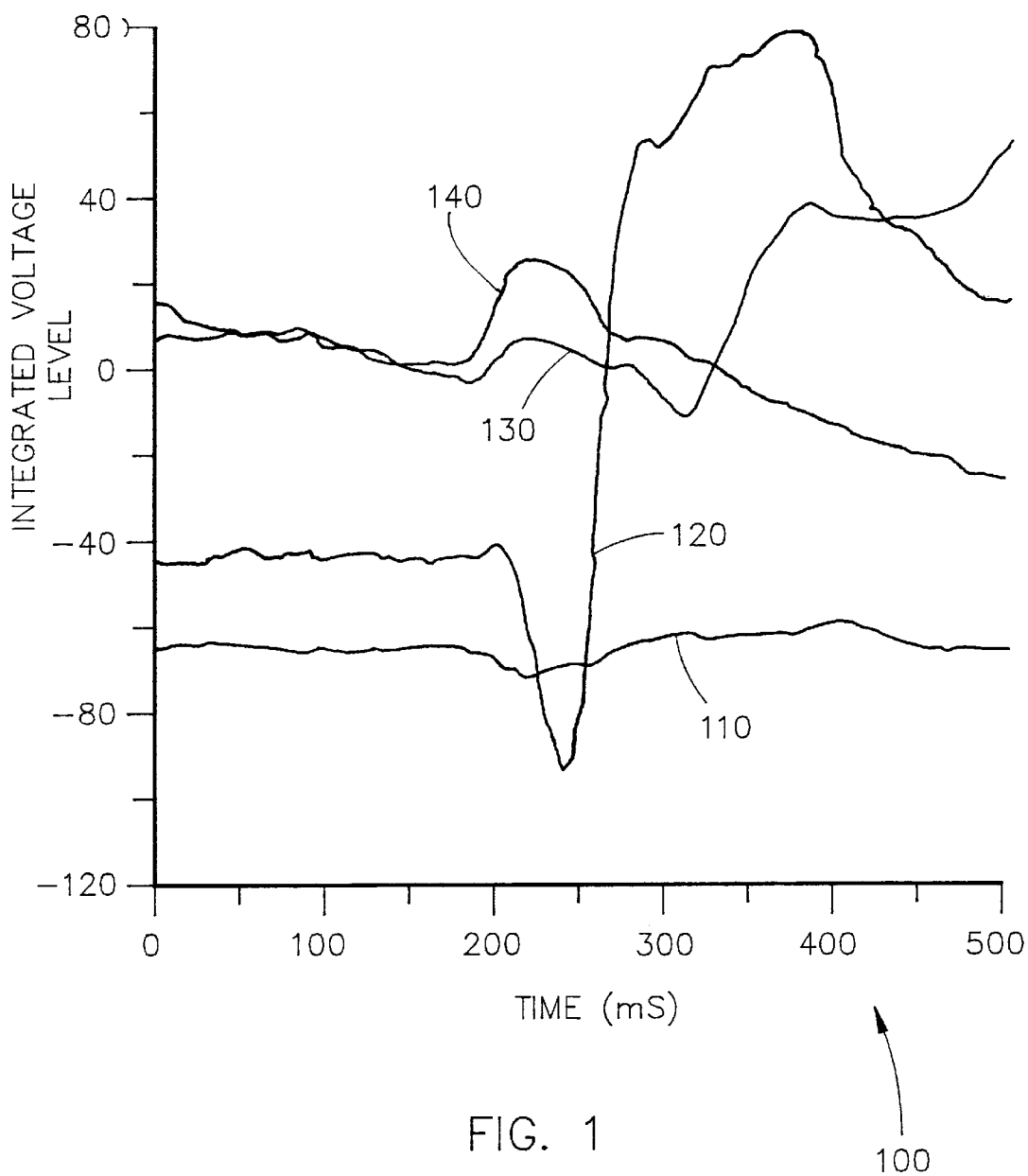
FIG. 1 shows a graph of the response of a baked product to an impact.

FIG. 1 shows a graph 100 containing test data that illustrates an exemplary doneness determination according to the present invention related to baking bread. In the figure, an impact occurs at time zero. Trace 110 is the reflected energy signal of a raw dough; trace 120 is the reflected energy signal of bread after baking for twelve minutes; trace 130 is the reflected energy signal of bread after baking for twenty-two minutes; and, trace 140 is the reflected energy signal of bread after baking for thirty minutes. As can be seen from the graph 100, the raw dough of trace 110 generates virtually no response to the impact. After baking for twelve minutes, the bread of trace 120 shows a voltage signal having a large response to impact, i.e., a large peak, which arrives sooner than through the raw dough (i.e., the baked product has a shorter flex response time in response to the impact). After baking for thirty minutes, the bread of trace 140 shows a voltage signal having a lesser peak, arriving even sooner than the previous traces. The change in arrival time of the response to impact during baking of the loaf of bread is approximately linear. The doneness can thus be determined, for example, by measuring the arrival time of the impulse (the flex response time), such as in trace 140.

This monitoring of the flex response time can in essence provide a measure of the elasticity of the baked product. When baking bread, the flex response can thus indirectly be a measurement of the polymerization of the gluten. For the baked product to be done, the returning impulse must arrive within a certain time period, or threshold, from the start of the test (i.e., from time zero). In the illustrated example, the total absolute difference in the impulse arrival times from raw dough to the baked product is greater than about 10 milliseconds (mS). Accordingly, the temporal resolution of the apparatus is preferably at least 5 mS.

Figure 2:
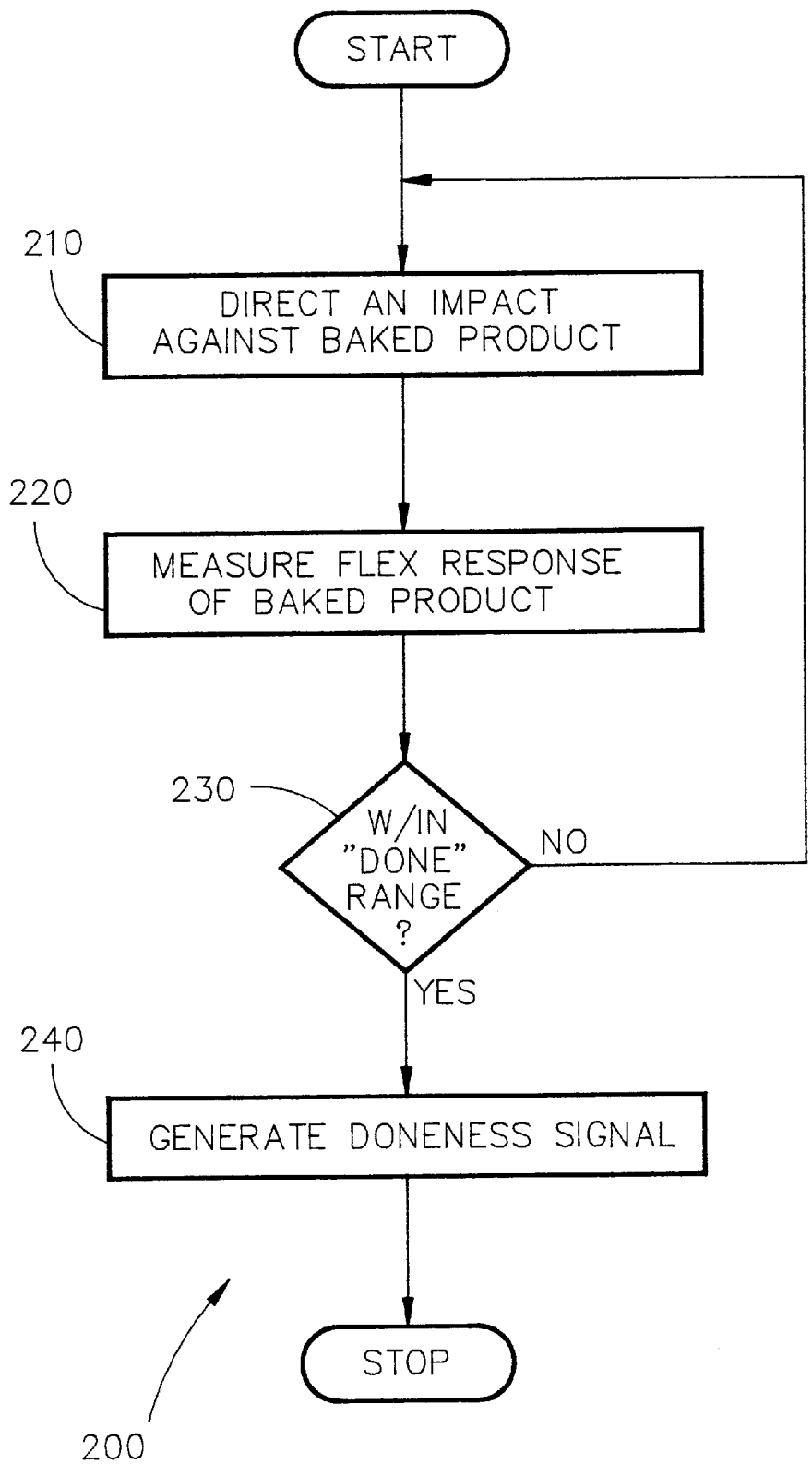
FIG. 2 shows a flowchart of a method according to one embodiment of the present invention.

Referring now to FIG. 2, the flowchart 200 illustrates a first basic embodiment of the present invention. In step 210, the monitoring is initiated when an impact is directed against a side of the baked product. The impact is preferably of a magnitude to cause shock waves to propagate through the baked product. In a preferred embodiment, the impact is caused by an air jet that imparts a force of approximately 5 to 20 pounds per square inch (psi). The impact magnitude should be varied according to the item being baked, and the impact magnitudes required will likely vary between different types of baked products. Therefore, the impact magnitude of 5 to 20 psi given above is not intended as a limitation, but rather only as an example, as it is envisioned that some baked products may require larger (or smaller) impact forces for an accurate doneness determination. Although the use of forced air is preferred, other means for impacting the baked product can be employed. For example, a mechanical means such as a movable arm or wall can be used to impact the product, or to otherwise cause the product to move. Nevertheless, it is much more preferred to avoid physical contact with the baked product in order to avoid physical marking or damage of the product.

Additionally, although less preferred, the impact means could include or consist of other means for moving the product—for example, a carrier on which the product rests could be vibrated or accelerated (e.g., linearly) to cause product motion.

In step 220 the flex response time of a sidewall of the baked product is measured. The "flex" can be, for example, an in-and-out motion (i.e., back-and-forth motion) of the product sidewall as a result of the impact or motion. In the preferred embodiments, wherein the baked product is a bread, the impact preferably generates a sidewall flex of, for example, about 1 to 2 millimeters. Accordingly, the spatial resolution is preferably about 0.1 millimeters, or less.

In the most preferred embodiments, with bread, the measurement is taken at a crown or top crust of the bread product at a sidewall opposite the impact area (the impact is also preferably at the crown). Among other things, the crown is typically more sensitive to the internal condition of gluten in a bread product. However, the invention may measure "flex" or movement at any location on the exterior of the baked product.

Most preferably, the flex response time measurement is performed by an ultrasonic means. The ultrasonic means can, e.g., direct ultrasonic waves against the sidewall and determine a distance from an ultrasonic transducer to the sidewall by measuring the phase delay of returning (i.e., reflected) ultrasonic waves. A phase delay measurement is preferably used because of the small distance involved, but alternatively the distance could be found by measuring the time for a pulse to return, and by calculating the range based on the time lag and the speed of sound. Although the measurement can be taken at the same side as the impact, or at another location, the measurement is preferably taken at a side opposite to the impact because the moving air from the air jet can interfere with the ultrasonic measurement. Although an ultrasonic measurement means is preferred, any appropriate measurement means can be employed, such as, for example only, a laser or optical measurement means or another known measurement means.

In step 230, the flex response time of the sidewall is compared to a pre-stored flex response time threshold. If the flex response time is within the pre-stored threshold, the baked product is judged to be done, and the method proceeds to step 240. If the flex response time is not within the acceptable range, the method proceeds back to step 210, and the measurement process is repeated. An appropriate computer, controller or processor can be used to make such a comparison.

In step 240, in response to an affirmative determination, a doneness signal is generated. The doneness signal can be used, for example, to provide an indication of doneness via an alarm or a display. The doneness signal may also be used to control the baking process itself. The invention can thus be used, for example, for the automated monitoring of baked products in a commercial bakery environment. The doneness signal can be advantageously used to control either the baking dwell time, the oven temperature, or both, or to control other baking variables. An appropriate computer, controller or processor can also be used to generate such a doneness signal and/or to control the baking process itself.

Figure 3:
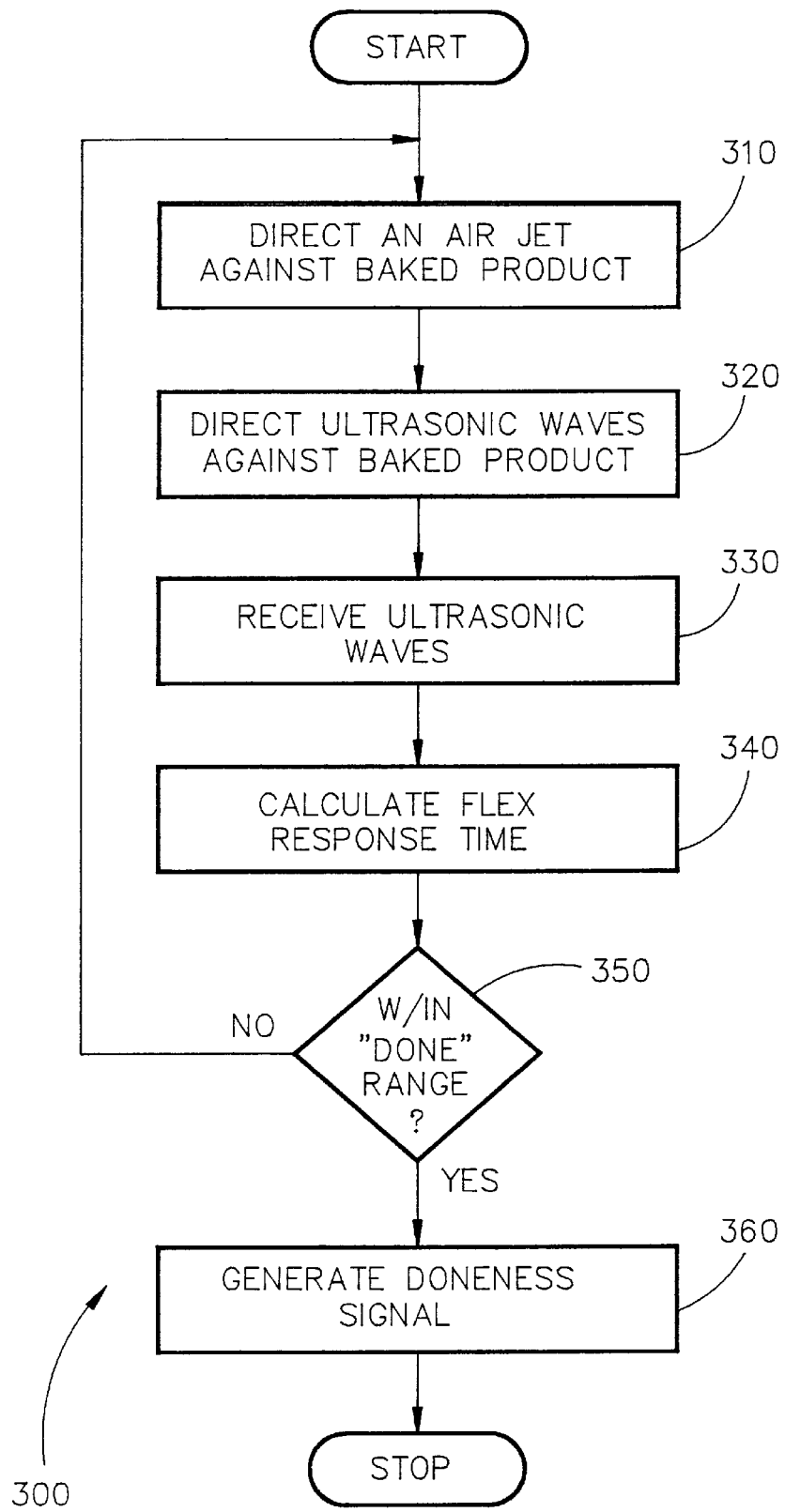
FIG. 3 shows a flowchart of the preferred embodiment of the method of the present invention.

FIG. 3 shows a flowchart 300 of a particular preferred embodiment of the present invention. The embodiment shown in FIG. 3 is similar to that in the basic embodiment of FIG. 2, but with preferred specific features as follows.

In step 310, an impact is directed against the crown of a sidewall of a baked product by directing an air jet against the sidewall.

In step 320, ultrasonic waves are directed against the crown of an opposite sidewall of the baked product.

In step 330, ultrasonic waves reflected from the sidewall are received.

In step 340, the reflected ultrasonic waves are used to measure the flex response time of the sidewall. Through repetitive distance measurements, the flex distance of the sidewall is computed and the time at which the sidewall flexes can be determined. The time at which the sidewall flexes is, in this embodiment, the time at which the detected distance to the sidewall greatly increases.

In the preferred embodiment, a phase delay is employed to measure the flex distance. In a less preferred embodiment, a time lag of the reflected wave is employed to measure the flex distance.

In step 350, the flex response time of the sidewall is compared to a pre-stored flex response time threshold. If the flex response time is less than the pre-stored threshold, the baked product is judged to be done, and the method proceeds to step 360. If the flex response time is not less than the threshold, the method proceeds back to step 310, where the measurement process may be repeated.

In step 360, in response to an affirmative determination, a doneness signal is generated. The doneness signal may be used to control the baking process, and can be used for the automated, non-contact monitoring of baked products in a commercial bakery environment. The doneness signal can be used to control either the baking dwell time or the oven temperature, or both.

Figure 4:
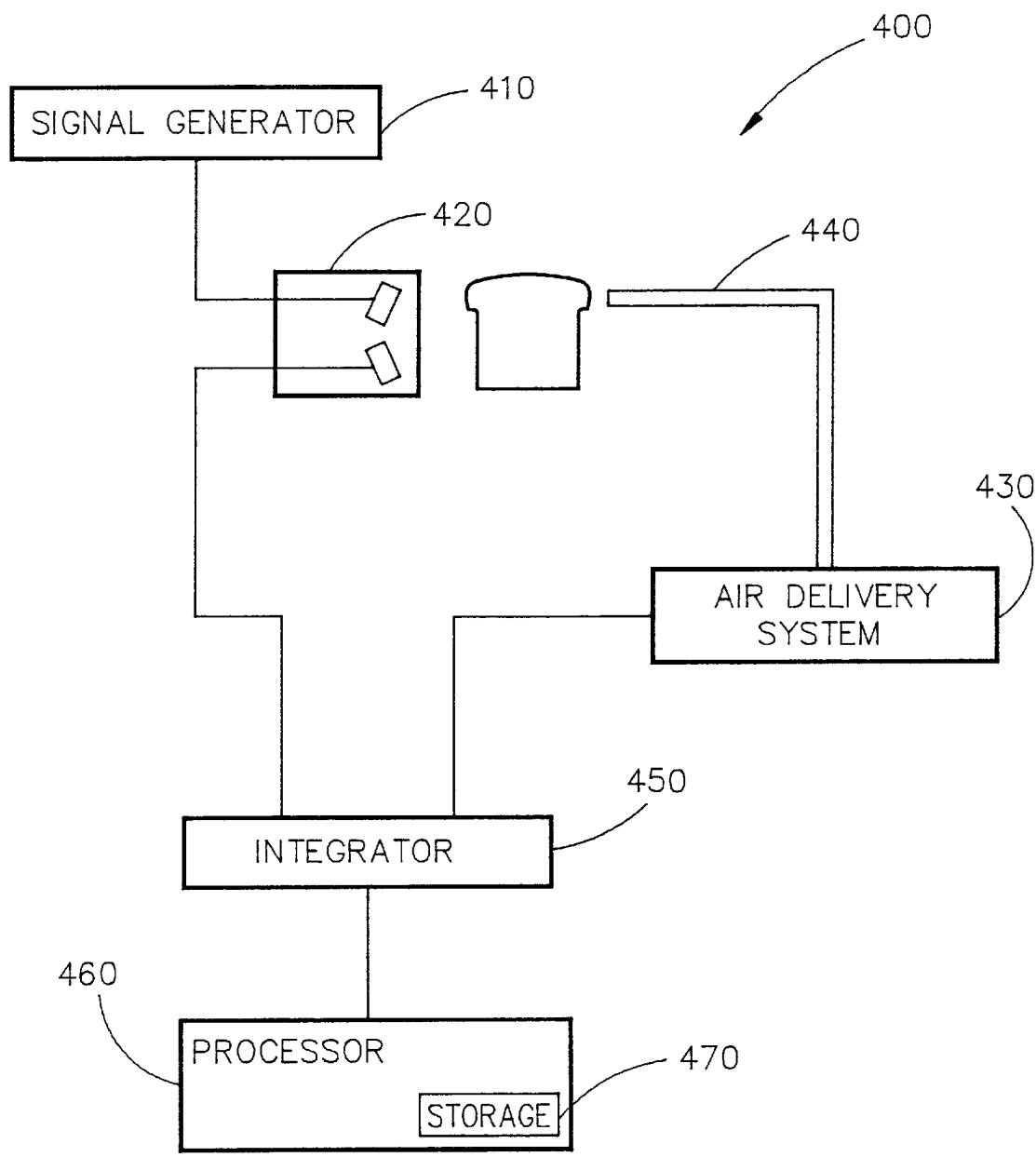
FIG. 4 shows a monitoring apparatus according to a preferred embodiment of the present invention.

FIG. 4 shows a monitoring apparatus 400 according to the most preferred embodiment of the invention. The monitoring apparatus 400 includes a signal generator 410, an ultrasonic transducer 420, an air delivery system 430, an air tube 440, an integrator 450, a processor 460, and a storage 470.

In one exemplary construction: the signal generator 410 is a Hewlett Packard model 8116 signal generator, available from the Hewlett Packard Co., Palo Alto, Calif.; the ultrasonic transducer 420 is a pitch-catch pair of industrial quality, 0.75 inch air-coupled acoustic transducers available from Panametrics, Inc., of Waltham, Mass. 02154; the integrator 450 is a Stanford Research Systems boxcar integrator; and the processor is composed of a model 2340 digital oscilloscope available from Tektronix coupled via an instrumentation bus to a Pentium personal computer of a type widely available in the art.

As shown in FIG. 4, the signal generator 410 is coupled to the ultrasonic transducer 420 and provides a radio frequency waveform to the ultrasonic transducer 420 in order to excite the ultrasonic transducer 420 and to generate ultrasonic waves. The ultrasonic transducer 420 in the preferred embodiment includes two transducer units, one to generate acoustic waves and one to receive the acoustic waves reflected from the baked product. Both transducer units of the ultrasonic transducer 420 are aimed at a crown of the baked product in order to produce the best reading of doneness. The signal generator 410 preferably produces a waveform of sufficient amplitude and energy, but in an alternative embodiment the invention may include an amplifier (not shown) coupled between the signal generator 410 and the ultrasonic transducer 420. The energy signal output from the ultrasonic transducer 420 is coupled to the integrator 450. The integrator 450 preferably can receive and use an un-amplified signal, but in an alternative embodiment, the invention may include an amplifier (not shown) coupled between the ultrasonic transducer 420 and the integrator 450.

The integrator 450 receives the energy signal and integrates the signal to provide an integrated energy signal in the form of an analog voltage. The integrator samples and integrates the reflected wave during a settable time window. In the preferred embodiment, the time window is 100 nanoseconds (nS) in length. The integrator 460 is further coupled to an air delivery system 430 (discussed below) for the purpose of coordinating an air jet impact with the 100 nS integration time window. The impact and measurement timing could alternatively be controlled by other components, such as the processor 460 or the signal generator 410.

The air delivery system 430 provides an air stream to the air tube 440, which is positioned so as to direct the stream of air against the side of the baked product. In the preferred embodiment, as shown, the air supply is directed at the crown of the baked product and can deliver an air stream at a pressure up to about 20 psi. The air stream can apply, for example, about 5–20 psi for a brief interval, e.g., about 100 mS. In the preferred embodiment, however, the air jet pressure is approximately 5–10 psi. The air tube 440 can be, for example only, a single copper tube having a diameter of about ½ inches or ⅜ inches. The air jet is coordinated with the acoustic wave pulses and the integration window of the integrator 450. The analog voltage level from the integrator 450 is received by the processor 460.

The processor 460 can be any processor known in the art capable of receiving and interpreting an analog signal. The processor 460 receives the analog peak that represents the maximum flex distance and measures the time period between the acoustic wave generation in the transducer and the receipt of the analog peak, this time period being, in this case, the flex response time. By monitoring the flex response time of the sidewall, the processor 460 can determine the doneness of the baked product and generate a doneness signal. The processor 460 compares the flex response time to a predetermined threshold. This predetermined threshold is stored in the storage 470 in the preferred embodiment. Where the time range resides, however, is not critical to the invention, and other storage locations can be used in other embodiments. If the flex response time is less than the stored threshold, the processor 460 generates the doneness signal. The doneness signal created by the processor 460 can be used, for example, to control the baking dwell time and temperature of a baking process.

FIGS. 5–8 show representative waveforms of an energy signal as it passes through the integrator 450. It should be noted that the waveforms are not to scale in terms of either amplitude or time and are included for purposes of illustration only.

Figure 5:
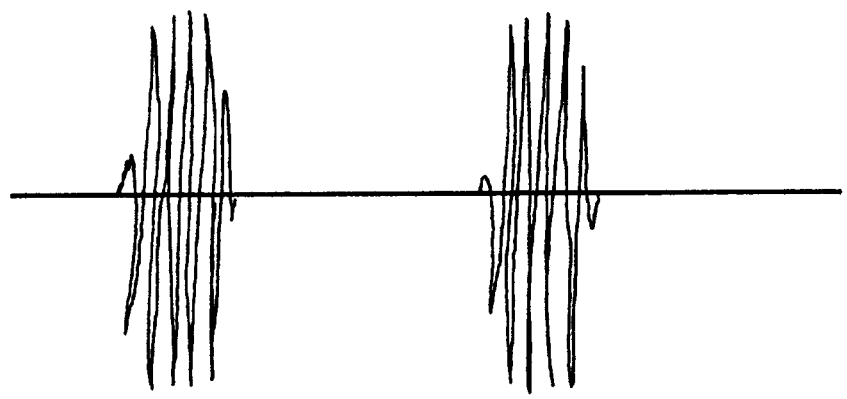
FIG. 5 is a plot of acoustic wave pulses used to detect the impact in a baked product.
Figure 6:
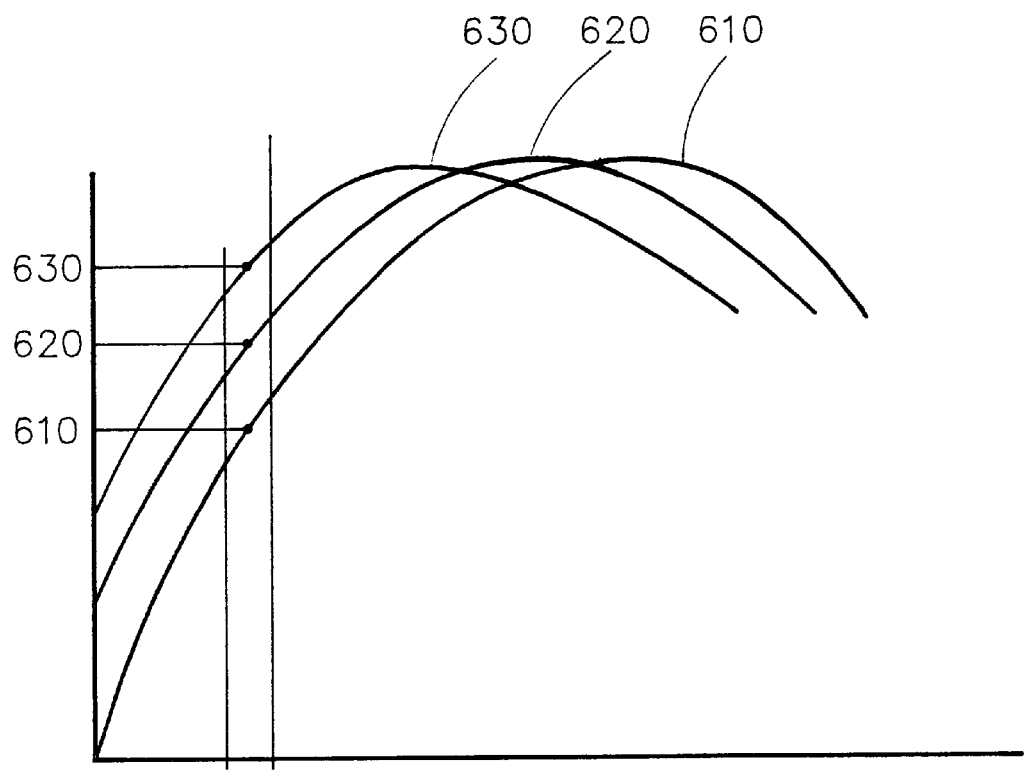
FIG. 6 is a plot of a phase shifting phenomena in reflected acoustic waves.

FIG. 5 shows pulse bursts that are produced by the signal generator 410. The pulse bursts are output as acoustic waves by the ultrasonic transducer 420 and are received by the ultrasonic transducer 420 after reflection from the baked product. If the sidewall of the baked product is stationary, the phase of the reflected wave will remain constant. However, if the sidewall is in motion either towards or away from the ultrasonic transducer 420, the phase of the reflected waves will change. The phase change measurement performed by the integrator 450 is shown in FIG. 6, where a portion of the wave shown in FIG. 5 is portrayed with a modified timescale in order to show the detail. The period denoted A is a delay period used to compensate for the time required for the wave pulse to travel to the target and back. The period denoted B is the 100 nanosecond (nS) integration period during which the received (reflected) wave is sampled. If the reflected wave shifts in phase by the reflection, the 100 nS integration window will receive and see a signal at a higher voltage level because of the size and location of the integration window. This can be seen from the three example waveforms in FIG. 6. When a sample is taken during the 100 nS time window of the wave 620, it will have a higher voltage level (vertical axis) than the wave 610. On the other hand, the wave 630 will produce a higher voltage reading than the wave 620.

Although the graph is exaggerated for clarity, it can be seen that by designing the apparatus to use a sampling time window that is small in proportion to the period of the wave, and occurring at a fixed time relative to the start of the test, the integrator 450 will see a voltage level that rises in an approximately linear fashion in response to a phase delay. The apparatus is preferably designed so that the phase delay is in proper proportion to the range of travel of the baked product, so that the phase delay does not exceed one quarter period of the wavelength. Therefore, the wavelength should be chosen to fit the desired range of travel of the target.

In the exemplary preferred embodiment where a range of motion of approximately 2 mm was desired to be measured, a center frequency of 100 kilohertz (kHz) was employed, giving the acoustic waves a wavelength of 3 mm. When an ultrasonic distance measuring device is employed, it preferably has a center frequency of less than two megahertz and, more preferably, between about fifty and five hundred kilohertz.

Figure 7:
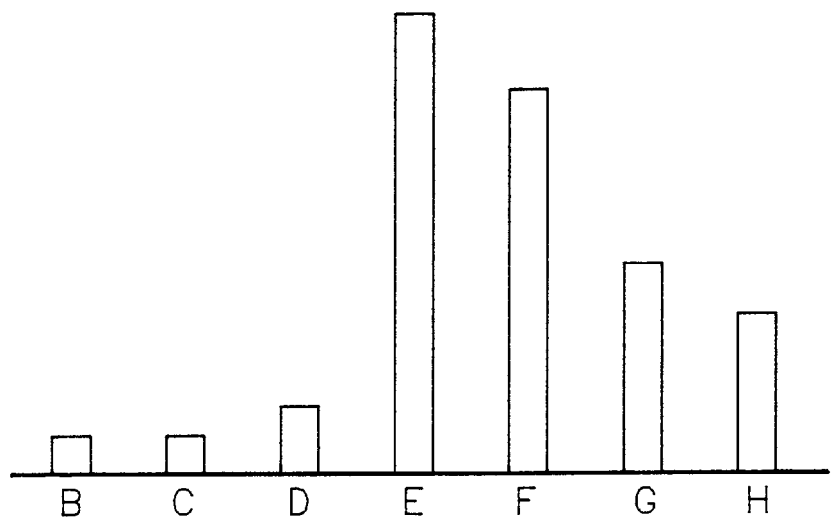
FIG. 7 is a plot of sampled waves.

FIG. 7 shows an exemplary series of such integration windows and their relative sizes. For small target displacements where the phase begins near zero, the voltage sensed during the integration window will be approximately linear. The samples labeled A–D are samples taken when the baked product is relatively motionless. Sample E shows a large displacement of the baked product, corresponding to the approximate time of impact. Samples F–H show the displacement as it dies out.

Figure 8:
FIG. 8 is a plot of integrated samples showing a peak that indicates flex distance and flex response time.

FIG. 8 shows the resultant voltage signal when the samples of FIG. 7 are integrated. The resultant waveform shows an abrupt rise in amplitude when the baked product is first impacted. This voltage signal can be used to determine the flex response time as measured from the initiation of the test to the time of maximum flex displacement.

Figure 9:
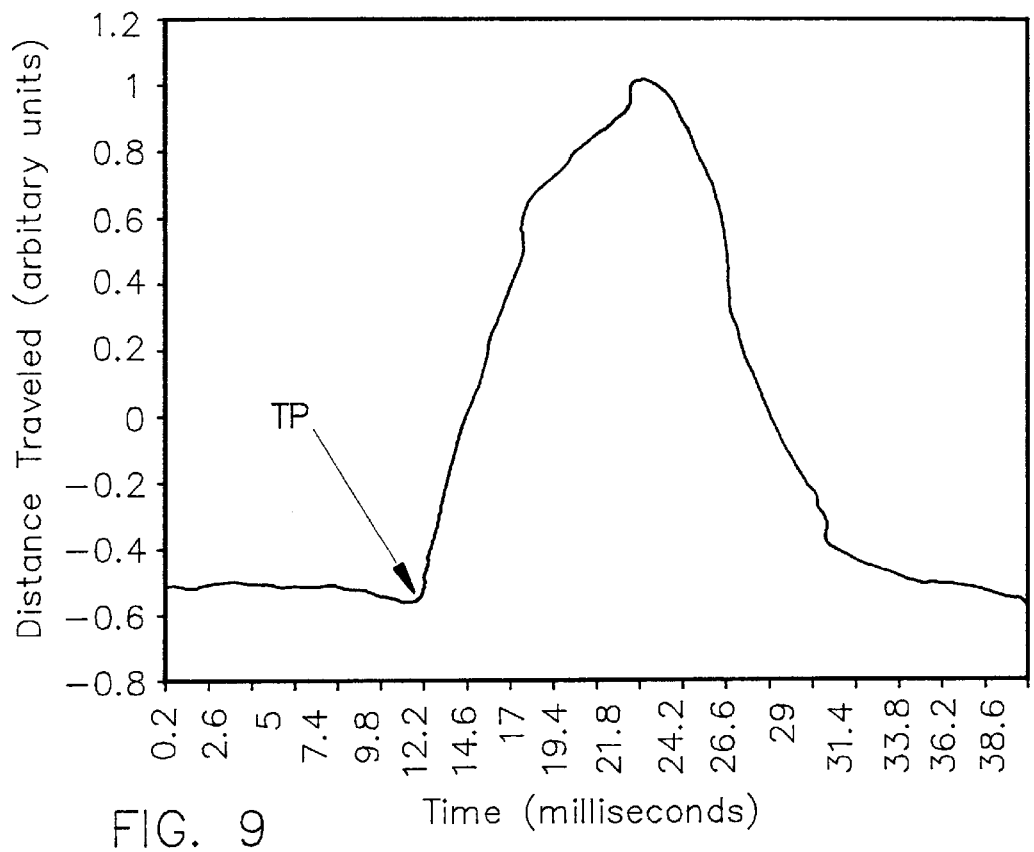
FIG. 9 shows an example of a response signal plotted over time.
Figure 10:
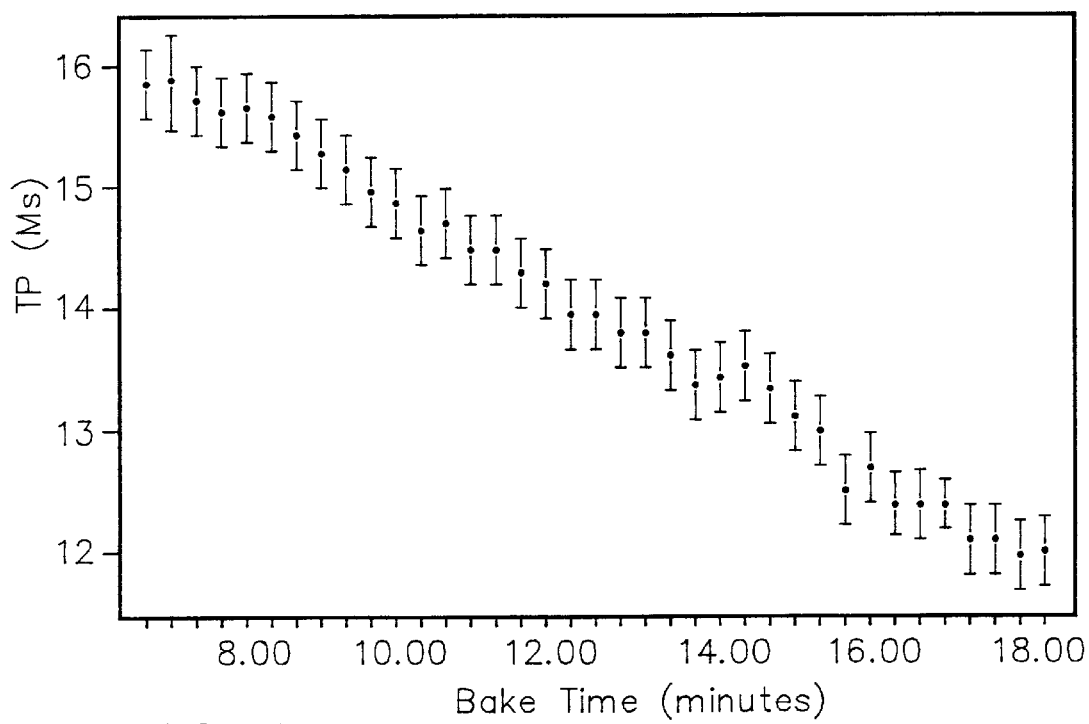
FIG. 10 shows exemplary test data of a plot of transition points of bread at various baking times.
Figure 11:
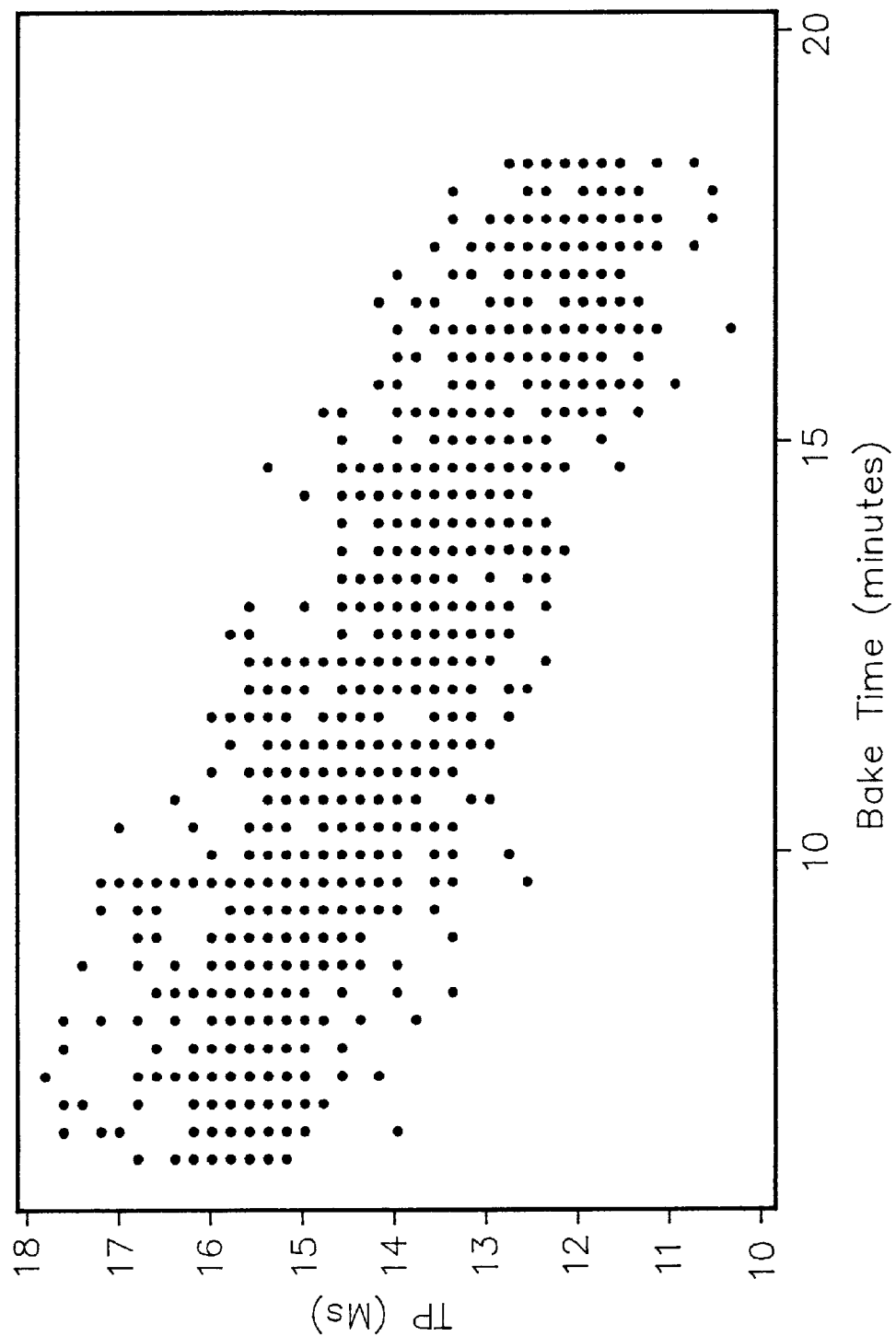
FIG. 11 shows a curve indicating bread doneness with 95% confidence interval based on the exemplary test data of the plot of transition points of bread at various baking times.

FIGS. 9–11 show an actual test data analysis that conducted in a study of one, non-limiting, embodiment of the invention. This analysis, and other aspects of various embodiments of the invention, are described in Faeth, et al., *On Line, Noncontact Baking Monitor For Bread,* Cereal Foods World, Vol. 44, No. 3, March 1999, pages 155+, the entire disclosure of which is incorporated herein by reference as though recited herein in full.

The test data analysis began with the plotting of signals as distance versus time, as shown in FIG. 9. As shown in FIG. 9, the transition point TP shows a point at which a loaf begins to change rapidly. In this data analysis, the transition point was recorded with pertinent data. In particular, TP data was collected in a test sample of 31 loaves. In FIG. 10, the TP values obtained are plotted on a scale of elapsed baking time. Where there is a very good correlation, all data points should fall on a curve with little scatter. In the illustrated case, however, the data are widely distributed about a mean that clearly shows a decrease in TP with increasing baking time. Assuming normal distribution for the TPs, the mean TP for each bake time has a correlation of −0.85, indicating a lower TP with increasing baking time. Comparing baking time to transition point, the mean TP ranges from 15.8 msec (sd=0.733) at 7 minutes baking time to 11.9 msec (sd=0.643) at 18 minutes baking time. In FIG. 11, the mean TP is plotted verses bake time, with indicators of 95% confidence interval. This plot is a function of the product and the oven combined.

In this latter example, the loaves studied were processed over many different days. The method was shown to be repeatable over time and reliable within a high confidence level. In this illustrative case, while the method could be used to detect doneness in one reading of a single loaf, the illustrative case appears to be more effective for a situation where data from a plurality of loafs, preferably a substantial number, is used to estimate doneness a batch (i.e., a plurality of loafs) of bread.

In this latter example, a multiple regression was also performed on TP verses bake time to determine a prediction equation, assuming a normal distribution. There, the F statistic was 2569.64 (p<0.000). The relation TP+91.7−1.77 B, where B is baking time, can be used to estimate TP from bake time. An examination of statistical residuals indicates virutally no influence of other variables. With statistical analysis, discrimination between baked and underbaked conditions can be provided.

While the preferred embodiments of the invention have been described in detail above, the invention is not intended to be limited strictly to the preferred embodiments of the invention as described and those skilled in the art may make numerous modifications of the preferred embodiments without departing from the inventive concepts herein.

What is claimed is:

1. A method for monitoring doneness of a baked product, comprising the steps of:
    directing an impact against a side of said baked product;
    measuring a flex response time of a side of said baked product as a result of said impact;
    comparing said flex response time to a predetermined threshold; and
    generating a doneness signal if said flex response time is within said predetermined threshold.

2. The method of claim 1, wherein said baked product is a bread product.

3. The method of claim 1, wherein said step of directing an impact against said side includes directing an air jet against said side of said baked product.

4. The method of claim 3, wherein said air jet is directed against a crown of said baked product.

5. The method of claim 1, wherein a spatial resolution of said measuring step has an uncertainty of no more than one-tenth of a millimeter.

6. The method of claim 1, wherein a temporal resolution of said measuring step has an uncertainty of no more than five milliseconds.

7. The method of claim 1, wherein the step of measuring said flex response time is performed on a side of the baked product opposite to said impact.

8. The method of claim 1, wherein the step of measuring said flex response time further includes the steps of:
    directing ultrasonic waves against a second side of said baked product;
    receiving said ultrasonic waves reflected from said second side of said baked product; and
    measuring a flex response time of said second side of said baked product as a result of said impact by measuring from a time of impact to a time of displacement in said second side of said baked product.

9. The method of claim 8, wherein the ultrasonic waves are centered at a frequency of between about fifty and five hundred kilohertz.

10. A method for monitoring doneness of a baked product, comprising the steps of:
    directing an impact against a first side of said baked product by directing an air jet against said first side;
    directing ultrasonic waves against a second side of said baked product;
    receiving said ultrasonic waves reflected from said second side of said baked product;
    measuring a flex response time of said second side of said baked product as a result of said impact by measuring from a time of impact to a time of displacement in said second side of said baked product;
    comparing said flex response time to a predetermined threshold; and
    generating a doneness signal if said flex response time is within said predetermined threshold.

11. The method of claim 10, wherein said baked product is a bread product.

12. The method of claim 10, wherein said air jet is directed against a crown of said baked product.

13. The method of claim 10, wherein a spatial resolution of said measuring step has an uncertainty of no more than one-tenth of a millimeter.

14. The method of claim 10, wherein a temporal resolution of said measuring step has an uncertainty of no more than five milliseconds.

15. The method of claim 10, wherein said first side and said second side are opposite sides.

16. The method of claim 10, wherein the ultrasonic waves are centered at a frequency of between about fifty and five hundred kilohertz.

17. An apparatus for monitoring of doneness of a baked product, comprising:
    impact means for generating an impact on an exterior surface of said baked product;
    distance measuring means for measuring a flex distance of said exterior surface of said baked product as a result of said impact, with said distance measuring means outputting an energy signal representative of said flex distance;
    integrator means for integrating said energy signal to create a flex response time;
    storage means for storing a flex response time threshold corresponding to doneness in said baked product; and
    processor means for receiving and comparing said flex response time to said flex response time threshold, and outputting a doneness signal when said flex response time is less than said flex response time threshold.

18. The apparatus of claim 17, wherein said impact means includes an air jet device.

19. The apparatus of claim 18, wherein said air jet device includes:
    an air delivery system capable of delivering an air flow; and
    a tubing connected to said air delivery system and having an open end directed at said baked product.

20. The apparatus of claim 18, wherein said air jet device is capable of delivering an air jet having a pressure of between about five and twenty pounds per square inch.

21. The apparatus of claim 17, wherein said impact means imparts an impulse to a carrier in which said baked product rests.

22. The apparatus of claim 21, wherein said impulse causes a sudden linear acceleration of said baked product.

23. The apparatus of claim 17, wherein said impact means imparts a vibration to a carrier in which said baked product rests.

24. The apparatus of claim 17, wherein said impact means is a mechanical impact device.

25. The apparatus of claim 17, wherein said distance measuring means includes an ultrasonic distance measuring device.

26. The apparatus of claim 25, wherein said frequency is between about fifty and five hundred kilohertz.

27. The apparatus of claim 25, wherein said ultrasonic distance measuring device uses a phase delay in a reflected wave to measure said flex distance.

28. The apparatus of claim 25, wherein said ultrasonic distance measuring device uses a time delay in a reflected wave to measure said flex distance.

29. The apparatus of claim 25, wherein the ultrasonic distance measuring device further includes:

a signal generator; and an ultrasonic transducer coupled to said signal generator and capable of outputting an energy signal representative of said flex distance.

30. The apparatus of claim 26, wherein said signal generator outputs a group of pulses approximately every 1.5 milliseconds, having four cycles per said group of pulses.

31. The apparatus of claim 17, wherein said baked product is a bread product.

32. The apparatus of claim 17, wherein said impact means and said distance measuring means are positioned on opposite sides of said baked product.

33. The apparatus of claim 17, wherein said impact means is directed against a crown of said baked product.

34. The apparatus of claim 17, wherein said doneness signal is used to control a baking dwell time.

35. The apparatus of claim 17, wherein said doneness signal is used to control a baking temperature.

36. The apparatus of claim 17, wherein said distance measuring means has a spatial resolution with an uncertainty of no more than one-tenth of a millimeter.

37. The apparatus of claim 17, wherein said distance measuring means has a temporal resolution with an uncertainty of no more than five milliseconds.

* * * * *